Figure 1:
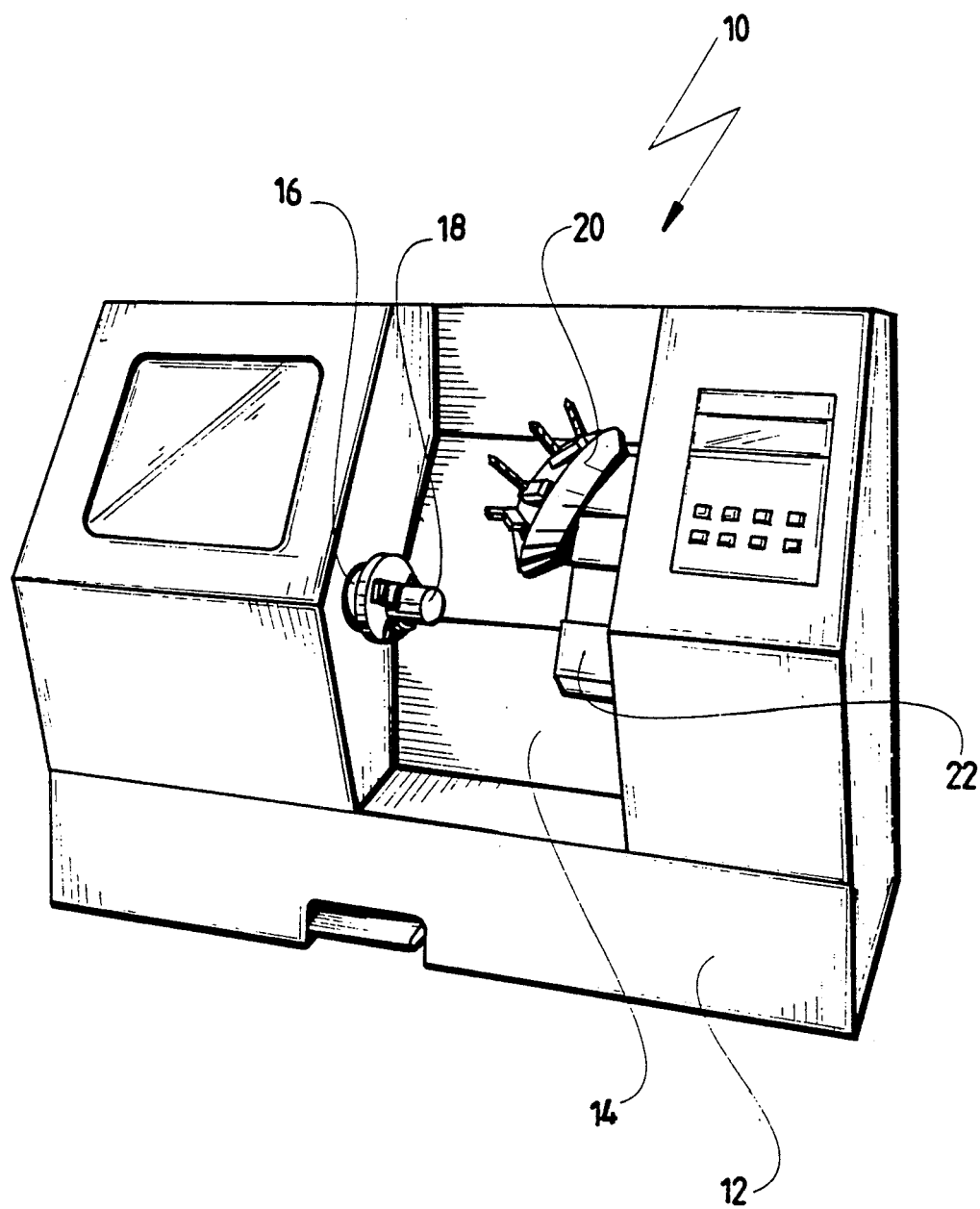

United States Patent [19]

Link

[11] Patent Number: 5,060,355
[45] Date of Patent: Oct. 29, 1991

[54] MACHINE TOOL WITH A HIGH-PRESSURE AND A LOW-PRESSURE HYDRAULIC NETWORK

[75] Inventor: Helmut F. Link, Aichwald, Fed. Rep. of Germany

[73] Assignee: Index-Werke Komm. -Ges. Hahn & Tessky, Fed. Rep. of Germany

[21] Appl. No.: 426,312

[22] Filed: Oct. 24, 1989

[30] Foreign Application Priority Data

Oct. 27, 1988 [DE] Fed. Rep. of Germany ....... 3836601

[51] Int. Cl.$^5$ .............................................. B23B 3/16
[52] U.S. Cl. ...................................... 29/42; 408/130; 82/132; 91/29
[58] Field of Search ...................... 29/42; 408/130, 10, 408/63; 409/154, 156, 196; 91/28, 29, 33; 82/137, 132, 138

[56] References Cited

U.S. PATENT DOCUMENTS

| | | | |
|---|---|---|---|
| 1,103,035 | 7/1914 | Clark | 91/29 |
| 2,802,453 | 8/1957 | Harp et al. | 91/33 |
| 2,905,441 | 9/1959 | Poundstone | 408/130 X |
| 3,353,429 | 11/1967 | Stuart | 408/63 X |

OTHER PUBLICATIONS

Durr, A. and Wachter, O., *Hydraulik in Werkzeugmaschinen*, Carl Hansesr Verlag, Munich, Germany, 1968, pp. 21-23.

Primary Examiner—Larry I. Schwartz
Assistant Examiner—Robert Schultz
Attorney, Agent, or Firm—Barry R. Lipsitz

[57] ABSTRACT

In order to improve a machine tool comprising at least one hydraulic drive for working motion or rapid motion operation connected via a supply pipe to a high-pressure network supplied by a high-pressure pump so that the drives can be operated with high pressure for working motion and to a substantial degree with low pressure for rapid motion, it is proposed that a low-pressure network supplied by a low-pressure pump be provided for operating the drive for rapid motion, that a flow-limiting member be arranged between the high-pressure network and the supply pipe for bringing about a pressure drop in the supply pipe during the rapid motion by limiting the flow of a hydraulic medium under high pressure and for maintaining the high pressure to a substantial degree during the working motion, and that the low-pressure network be connected to the supply pipe via a check valve which is open on account of the pressure drop during the rapid motion and closed during the working motion.

18 Claims, 3 Drawing Sheets

MACHINE TOOL WITH A HIGH-PRESSURE AND A LOW-PRESSURE HYDRAULIC NETWORK

The invention relates to a machine tool comprising at least one hydraulic drive for working motion or rapid motion operation connected via a supply pipe to a high-pressure network supplied by a high-pressure pump.

In particular, in machine tools which have a large number of hydraulic drives, for example, multiple-spindle automatic lathes, indexing plate machines and transfer machines comprising, in particular, a large number of electrohydraulic slide drives, a central high-pressure hydraulic network is usually provided for supplying all of the drives. This concept has the advantage that only one pump is required for supplying the high-pressure network.

This concept does, however, have the major disadvantage that all of the drives are operated with high pressure during both the working motion with a small flow of hydraulic medium and the rapid motion with a large flow of hydraulic medium, although high pressure would only be necessary for generating the large feed forces required during the working motion, whereas only frictional and flow forces have to be overcome during the rapid motion and so a substantially lower pressure would be adequate.

The object underlying the invention is, therefore, to so improve a machine tool of the generic kind that the drives can be operated with high pressure during the working motion and to a substantial degree with low pressure during the rapid motion.

This object is accomplished, in accordance with the invention, in a machine tool of the kind described at the beginning by a low-pressure network supplied by a low-pressure pump being provided for operating the drive for rapid motion, by a flow-limiting member being arranged between the high-pressure network and the supply pipe for bringing about a pressure drop in the supply pipe during the rapid motion by limiting the flow of a hydraulic medium under high pressure and for maintaining the high pressure to a substantial degree during the working motion, and by the low-pressure network being connected to the supply pipe via a check valve which is open on account of the pressure drop during the rapid motion and closed during the working motion.

The advantage of the inventive solution is to be seen in the fact that it can be operated to a substantial degree with only low pressure during rapid motion, which results in a considerable saving of energy. In addition, the total power required in such a machine tool is substantially lower, not to mention the considerably smaller temperature rise in the hydraulic system, which means that cooling units in the hydraulic system can either be dispensed with or be of substantially smaller size. A further advantage is that the entire high-pressure network may be of small cross-sectional design and only the low-pressure network has to be of such size as to accommodate large quantities of oil.

Finally, a major advantage of the inventive solution in connection with machining precision of the machine tools is to be seen in the fact that in the high-pressure network only small quantities of oil flow to the individual drives, which eliminates any significant pressure surges during connection and disconnection of the individual drives, in contrast with the known concept wherein when one of the drives is operated for rapid motion, those drives being used for working motion, for example, those of tools performing a cutting operation, are negatively affected by the pressure drop.

In addition, the inventive solution ensures that high pressure is always used when the drives are started from a standstill and so the static friction is more easily overcome.

It is, in fact, known from the prior art to connect in parallel a high-pressure pump and a low-pressure pump for feeding the supply pipe, with a check valve between the low-pressure pump and the supply pipe, and the low-pressure pump connected for free circulation via a directional control valve controlled by the pressure in the supply pipe. This solution does, however, have the disadvantage that the high-pressure pump always conveys at full capacity even during rapid motion operation and that the low-pressure pump is only brought into use when the pressure collapses in the supply pipe owing to the limited conveying capacity of the high-pressure pump. Hence in this system a high-pressure pump and a low-pressure pump are required for each drive, for when the drive is being operated for rapid motion, the high-pressure pump is no longer generating any high pressure with which another drive could be operated.

In the simplest case, the flow-limiting member could be a simple throttle. This would, however, have the disadvantage of being effective during both working motion and rapid motion. For this reason, it is advantageous for the flow-limiting member to be effective when a preselectable maximum flow of hydraulic medium determined by a maximum possible consumption during working motion is exceeded.

Activation of the flow-limiting member when this maximum flow is exceeded is possible in a particularly simple manner by the flow-limiting member being pressure-controlled.

In order to generate a pressure gradient required for controlling the flow-limiting member which is dependent upon the flow of hydraulic medium passing through the flow-limiting member, provision is made for the flow-limiting member to be controlled by a pressure difference occuring at an orifice plate.

In principle, the orifice plate may be placed at any point between the high-pressure network and the drive. It is, however, particularly expedient for the orifice plate to be arranged downstream from the flow-limiting member.

In the embodiments described so far, it was merely assumed that the low-pressure network is connected to the supply pipe via the check valve, but it was not indicated how the connection to the supply pipe is to be implemented in view of the presence of an orifice plate. In a preferred first variant, provision is made for the check valve to be connected to an intermediate pipe located between the flow-limiting member and the orifice plate, as a result of which part of the hydraulic medium under low pressure flows through the orifice plate even when the check valve is open and thereby maintains the pressure drop occurring at the orifice plate.

In this variant, the flow-limiting member is expediently a pressure-controlled shut-off valve which closes when a switching value is exceeded and so when a pressure gradient exceeding the switching value occurs at the orifice plate, the flow-limiting member stops the flow of hydraulic medium from the high-pressure network to the supply pipe.

In particular, in order to allow a large quantity of hydraulic medium under low pressure to flow to the drives during rapid motion, provision is made for the orifice plate of the variant described above to have a check valve connected in parallel with it so as to open at an opening pressure which is larger than the switching value of the shut-off valve. In this way, when the pressure gradient at the orifice plate becomes greater than that required for maintaining the switched-off state of the shut-off valve, the check valve connected in parallel with the orifice plate opens and hence creates a bypass to the orifice plate so that the entire hydraulic medium under low pressure does not have to flow through the orifice plate and, in all, the flow resistance of the arrangement is decreased and, consequently, large quantities of hydraulic medium can flow during rapid motion.

In a second variant, provision is made for the check valve to be connected to the supply pipe downstream from the orifice plate so that the hydraulic medium under low pressure does not flow through the orifice plate during rapid motion operation.

In this variant, provision is expediently made for the flow-limiting member to be a pressure-controlled throttle valve which limits the flow of hydraulic medium under high pressure to the preselectable maximum flow which is advantageously selected such that it lies above the flow required by the drives for working motion operation.

In the embodiments described so far, no details were given of the design of the low-pressure network. It is, for example, advantageous for the low-pressure network to include a low-pressure reservoir, as a small pumping capacity is then adequate and a peak consumption can be compensated via the low-pressure reservoir.

In a prefered embodiment, provision is made for a check valve to be provided between the low-pressure network and the low-pressure pump so that it is possible to switch the low-pressure pump to free circulation when the low pressure is reached in the low-pressure network.

An expedient way of achieving this is for a tank pipe with a low-pressure reservoir charging valve controlled by the pressure in the low-pressure network to branch off from a connection between the check valve and the low-pressure pump. When the low pressure in the low-pressure network lies below a reference value, the low-pressure reservoir charging valve always closes so that the low-pressure pump feeds hydraulic medium under low pressure into the low-pressure network via the check valve, whereas when the low pressure is reached and the low-pressure reservoir is preferably full, the reservoir charging valve opens and the low-pressure pump switches to free circulation, with the check valve then preventing a return flow from the low-pressure network.

Details of the high-pressure network were also not given in the embodiments described so far. It is similarly expedient for the high-pressure network to include a high-pressure reservoir so that the pumping capacity can be chosen smaller and this high-pressure reservoir can com-consumption peaks.

It is similarly advantageous for a check valve to be provided between the high-pressure pump and the high-pressure network so that the high-pressure pump can be switched to free circulation when the reference value for the high pressure in the high-pressure network is reached.

In this connection, it is also highly expedient for a return pipe with a high-pressure reservoir charging valve controlled by the pressure in the high-pressure network to branch off between the high-pressure pump and the check valve and for the high-pressure reservoir charging valve to open and allow the hydraulic medium conveyed by the high-pressure pump to flow off via the return pipe when the reference value for the high pressure in the high-pressure network is reached.

In a simple embodiment, the return pipe may be designed so as to lead directly into the tank for hydraulic medium in the same manner as the tank pipe described above. Optimum exploitation of the capacity of the high-pressure pump, is, however, obtained when the return pipe opens into the tank pipe between the check valve and the low-pressure reservoir charging valve so that the hydraulic medium under high pressure can also be used to supply the low-pressure network and, in particular, assist the conveying capacity of the low-pressure pump in the event of a rapid drop of the pressure in the low-pressure network.

Figure 2:
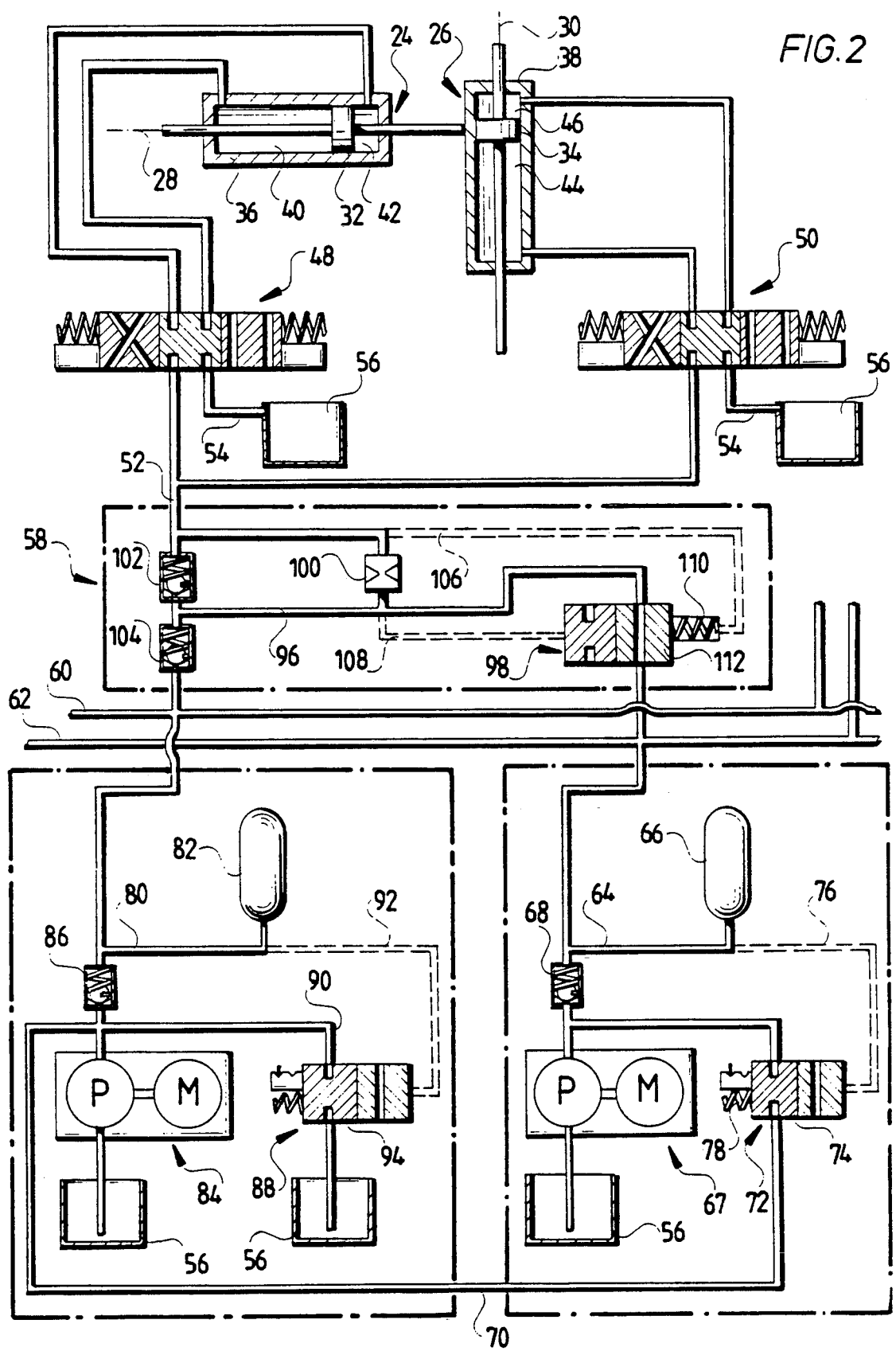
Figure 3:
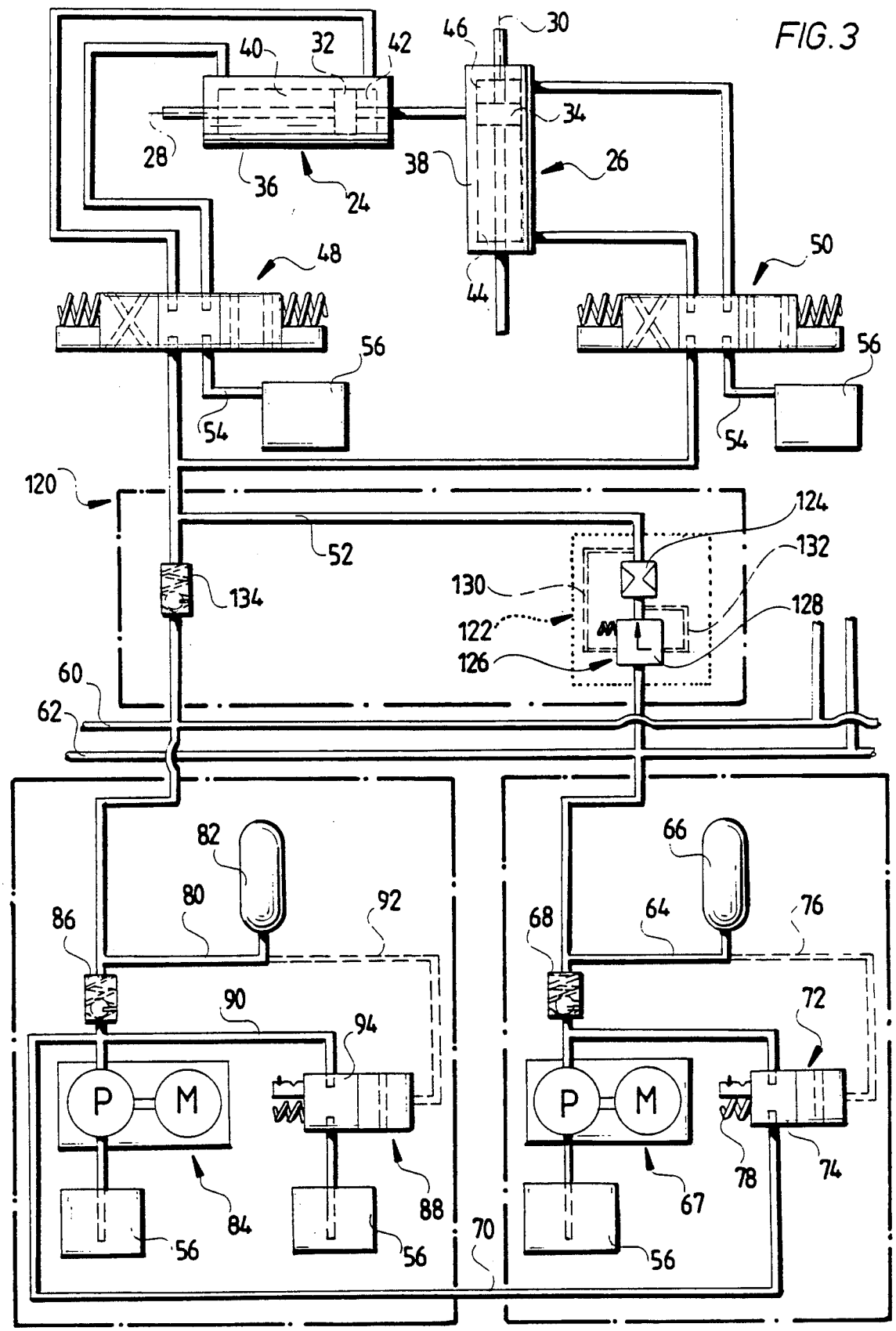

Further features and advantages of the inventive solution are to be found in the following description and the appended drawings of several embodiments. The drawings show:

FIG. 1 a complete view of a machine tool according to the invention;

FIG. 2 a schematic illustration of a first variant of the inventive solution; and FIG. 3 a schematic illustration of a second variant of the inventive solution.

An embodiment of a machine tool in the form of a lathe designated in its entirety 10 in FIG. 1 comprises a frame 12 with a work space 14 into which a work spindle 16 protrudes from the left in FIG. 1. A workpiece 18 can be clamped for machining in the work spindle 16. The machining of the workpiece 18 is carried out by means of a tool holder 0 which is arranged in the work space 14 and is displaceable in the direction of two axes on a compound slide 22.

As shown in FIG. 2, the compound slide 22 is displaceable in the direction of a first axis 28 and a second axis 30 by a drive in the form of a first electrohydraulic slide drive 24 and a second electrohydraulic slide drive 26.

Each of the slide drives 24, 26 comprises a piston 32 and 34, respectively, which is displaceable in the direction of the respective axis 28 and 30, respectively, and divides a cylinder housing 36 and 38, respectively, into two cylinder chambers 40, 42 and 44, 46, respectively.

The slide drives 24 and 26, respectively, are controlled via a first control valve 48 and a second control valve 50, respectively. Depending on how they are activated by a machine control system, the first and second control valves 48 and 50, respectively, connect one of the cylinder chambers 40 or 42 and 44 or 46, respectively, with a supply pipe 52 for hydraulic medium and the respective other cylinder chamber 42 or 40 and 46 or 44, respectively, with a tank return pipe 54 for returning the hydraulic medium to the tank 56 provided for it.

Via a network switchover system designated in its entirety 58, the supply pipe 52 can be connected either to a low-pressure collecting pipe 60 or to a high-pressure collecting pipe 62.

The high-pressure collecting pipe 62 is part of a high-pressure network which comprises a high-pressure feed pipe 64 which branches off from the high-pressure collecting pipe and is connected to a high-pressure reservoir 66.

A high-pressure pump designated in its entirety 67 conveys hydraulic medium from the above-mentioned tank 56 via a check valve 68 into the high-pressure feed pipe 64 insofar as a return pipe 70 branching off between an outlet of the high-pressure pump 67 and the check valve 68 is blocked by a high-pressure reservoir charging valve 72 arranged in the return pipe 70. The high-pressure reservoir charging valve 72 is designed as a shut-off valve and comprises a valve spool 74 which is acted upon, on the one hand, via a control pipe 76 branching off from the high-pressure feed pipe 64 by the pressure prevailing in this high-pressure feed pipe 64 and, on the other hand, by a spring 78 in the direction of its closed position. If the pressure in the high-pressure feed pipe 64 exceeds a reference value settable by the spring 78, the valve spool 74 acted upon by this pressure via the control pipe 76 is moved in the direction of its open position and no longer blocks the return pipe 70 so that hydraulic medium now flows off via the return pipe 70 instead of into the high-pressure feed pipe 64 via the check valve 68. Contrarily, if the pressure in the high-pressure feed pipe 64 drops below the reference value, the valve spool 74 closes the return pipe 70 again, and the high-pressure pump 67 again conveys hydraulic medium into the high-pressure feed pipe 64 via the check valve 68.

The low-pressure network comprises a low-pressure feed pipe 80 which branches off from the low-pressure collecting pipe 60 and a low-pressure reservoir 82 which is connected to the low-pressure feed pipe 80. Similarly, a low-pressure pump 84 conveys hydraulic medium from the tank 56 via a check valve 86 into the low-pressure feed pipe 80 insofar as a low-pressure reservoir charging valve 88 blocks a tank pipe 90 which branches off between an outlet of the low-pressure pump 84 and the check valve 86. The low-pressure reservoir charging valve 88 is connected via a control pipe 92 to the low-pressure feed pipe 80, and a valve spool 94 of the low-pressure reservoir charging valve 88 operates in the same way as the valve spool 74 of the high-pressure reservoir charging valve 72. For a description of the mode of operation, reference should, therefore, be had to the statements on the high-pressure reservoir charging valve 72. The tank pipe 90 opens directly into the tank 56 for hydraulic medium.

The return pipe 70 in which the high-pressure reservoir charging valve 72 is arranged similarly opens into the tank pipe 90 between the check valve 86 and the low-pressure reservoir charging valve 88. This enables use of the excessive hydraulic medium conveyed by the high-pressure pump 67 for feeding the low-pressure feed pipe 80 in addition to the hydraulic medium conveyed by the low-pressure pump 84.

The network switchover system 58 according to the invention comprises an intermediate pipe 96 which is connectable via a differential pressure valve 98 to the high-pressure collecting pipe 62. An orifice plate 100 is arranged between the intermediate pipe 96 and the supply pipe 52. Parallel to the orifice plate 100, i.e., similarly between the intermediate pipe 96 and the supply pipe 52 is a check valve 102 which opens when a predetermined opening pressure is exceeded. This check valve 102 opens when the difference between the pressure in the intermediate pipe 96 and the supply pipe 52 exceeds the opening pressure, thereby creating a bypass to the orifice plate 100.

The low-pressure collecting pipe 60 is connected to the intermediate pipe 96 via a check valve 104 which is always closed when the pressure in the intermediate pipe 96 is greater than that in the low-pressure collecting pipe 60.

The differential pressure valve 98 measures via a first control pipe 106 the pressure in the supply pipe 52 and via a second control pipe 108 the pressure in the intermediate pipe 96. The pressure in the first control pipe 106 acts, with the additional aid of a spring 110, on a valve spool 112 of the differential pressure valve 98 in the direction of its open position, i.e, that which connects the intermediate pipe 96 with the high-pressure collecting pipe 62, while the pressure in the second control pipe 108 attempts to move the valve spool 112 in the direction of its closed position.

The network switchover system 58 according to the invention operates as follows:

On the assumption that the working motions of the compound slide 22 are, as is known, always very slow, but have to be carried out with hydraulic medium under high pressure, it is possible to ascertain a maximum consumption of hydraulic medium under high pressure during displacement of the compound slide 22 along both axes. A typical maximum flow of hydraulic medium under high pressure is approximately 2 liters per minute.

In order to ensure that the supply pipe 52 is solely supplied with hydraulic medium under high pressure for the duration of the entire working motions, the orifice plate 100 is selected such that the pressure gradient occurring thereat does not exceed even in the case of maximum flow a switching value which would be required to switch the valve spool 112 of the differential pressure valve 98 over from its open to its closed position against the force of the spring 110.

In this case, the intermediate pipe 96 is always connected to the high-pressure collecting pipe 62 and so the check valve 104 remains closed and only hydraulic medium under high pressure flows from the intermediate pipe 96 via the orifice plate 100 to the supply pipe 52. Since the pressure drop at the orifice plate 100 does not exceed the switching value, the force of the spring 110 together with the force caused by the pressure in the supply pipe 52 acting upon the valve spool 112 outweighs the force exerted by the pressure in the intermediate pipe 96 and so the spool valve 102 always remains open. If, however, one of the slide drives 24 or 26 or both slide drives 24, 26 carry out a rapid motion, the maximum flow of hydraulic medium is higher. It can, for example, reach a typical value of 20 liters per minute. In this case, a pressure gradient occurs at the orifice plate 100 which exceeds the switching value of the differential pressure valve 98 and so the force exerted on the valve spool 112 by the pressure in the intermediate pipe 96 moves the valve spool 112 in the direction of its closed position, i.e., that which disconnects the intermediate pipe 96 from the high-pressure collecting pipe 62. This results in the check valve 104 opening and in hydraulic medium flowing from the low-pressure collecting pipe 60 via the check valve 104 into the intermediate pipe. This hydraulic medium first flows via the orifice plate 100 in order to keep the pressure gradient occurring thereat above the switching value of the differential pressure valve 98 so that the latter remains in its closed position.

In the case of a very high consumption of hydraulic medium during the rapid motions, the orifice plate 100 does, however, represent an undesired flow resistance. For this reason, the opening pressure of the check valve 102 is selected such that the latter opens when the pressure gradient at the orifice plate 100 exceeds the switching value for the differential pressure valve 98. For example, the opening pressure of the check valve 102 is selected twice as high as the switching value of the differential pressure valve 98. If the pressure gradient at the orifice plate 100 exceeds the opening pressure of the check valve 102, the latter likewise opens, thereby creating a bypass to the orifice plate 100 and so the flow resistance of the combination of the orifice plate 100 and the check valve 102 connected in parallel therewith decreases and does not limit the speed of the rapid motion.

Once the rapid motion is completed, the pressure gradient at the orifice plate 100 collapses again to the extent that it drops below the switching value of the differential pressure valve 98 so the latter opens again, and the check valve 104 closes again due to the increase of the pressure in the intermediate pipe 96.

Accordingly, in that instant at which the slide drives 24, 26 carry out rapid motions, the network switchover system 58 causes no more hydraulic medium to be taken from the high-pressure collecting pipe 62, but merely hydraulic medium from the low-pressure collecting pipe 60, as the lower pressure of the hydraulic medium is fully adequate for the rapid motions, whereas when working motions with large counterforces are to be carried out, the drives 24, 26 operate only with hydraulic medium under high pressure from the high-pressure collecting pipe 62.

Typical values of the pressure in the high-pressure collecting pipe are approximately 100 bar, while a typical value of the pressure in the low-pressure collecting pipe is approximately 30 bar. The switching value of the differential pressure valve 98 may be, for example, about 0.5 bar, while the opening pressure of the check valve 102 should then be approximately 1 bar.

A second embodiment of the inventive solution, illustrated in FIG. 3, bears the same reference numerals, insofar as the same parts are used. Therefore, for a description of these, reference should be had to the statements on the first embodiment illustrated in FIGS. 1 and 2.

The network switchover system 120 is of different design from that of the first embodiment. The network switchover system 120 comprises a flow-limiting valve designated in its entirety 122 which is located between the high-pressure collecting pipe 62 and the supply pipe 52. The flow-limiting valve 122 comprises an orifice plate 124 and a differential pressure valve 126 acting as throttle valve and preceding the orifice plate 124. The control piston 128 of the differential pressure valve 126 is acted upon via a first control pipe 130 by hydraulic medium under the pressure before the orifice plate 124 and via a second control pipe 132 by hydraulic medium under the pressure after the orifice plate 124 in the closed and open direction, respectively, so that in the case of a large pressure drop at the orifice plate, i.e., a high flow rate, the differential pressure valve 126 exerts a throttling effect, whereas in the case of a slight pressure drop at the orifice gate 124, i.e., a low flow rate, it opens. Hence this flow-limiting valve 122 enables setting of a maximum flow of hydraulic medium which is selected so as to correspond to at least the maximum consumption during working motions of both drives 24, 26.

In addition to the flow-limiting valve 122, the network switchover system 120 comprises a check valve 134 located between the low-pressure collecting pipe 60 and the supply pipe 52. The check valve 134 has the same function as the check valve 104 of the network switchover system 58.

The second embodiment operates as follows: When the slide drives 24, 26 carry out rapid motions, a pressure drop occurs in the supply pipe 52 due to the maximum flow of hydraulic medium from the high-pressure collecting pipe 62 to the supply pipe 52 set by the flow-limiting valve 122 being exceeded. Once the pressure in the supply pipe 52 drops below the pressure in the low-pressure collecting pipe 60, the check valve 134 opens so that hydraulic medium under low pressure can flow into the supply pipe 52. In contrast with the first embodiment, however, the supply of hydraulic medium under high pressure is not cut off, but merely limited to the maximum flow settable at the flow-limiting valve 122.

When the rapid motion of the drives 24, 26 is completed, the pressure in the supply pipe 52 rises above the pressure in the low-pressure collecting pipe 60 again so that the check valve 134 closes and the supply pipe 52 is again supplied with hydraulic medium under high pressure via the flow-limiting valve 122 during the working motions of the drives 24, 26.

The present disclosure relates to the subject matter disclosed in German application No. P 38 36 601.0-14 of Oct. 27, 1988, the entire specification of which is incorporated herein by reference.

What is claimed is:

1. A machine tool comprising:
   a hydraulic drive for operation in a working motion with a demand of hydraulic medium below a preselectable maximum flow or in a rapid motion with a demand of hydraulic medium above said preselectable maximum flow;
   high pressure network means for operating said hydraulic drive in said working motion;
   a high pressure pump coupled to supply said high pressure network;
   low pressure network means for operating said hydraulic drive in said rapid motion;
   a low pressure pump coupled to supply said low pressure network;
   flow limiting means coupled to said high pressure network;
   a supply pipe coupled between said flow limiting means and said hydraulic drive;
   flow detecting means arranged within said supply pipe for detecting the flow of hydraulic medium through said supply pipe;
   said flow limiting means being responsive to said flow detecting means for limiting the flow of a hydraulic medium from the high pressure network into said supply pipe to said preselectable maximum flow to create a pressure drop in said supply pipe during rapid motion of said drive and to establish high pressure in said supply pipe to a substantial degree during said working motion of said drive; and
   check valve means, coupled between said low pressure network and said supply pipe for connecting said low pressure network to said supply pipe by opening in response to said flow limitation caused by said flow limiting means during rapid motion of said drive.

2. Machine tool as defined in claim 1, characterized in that said flow-limiting means are pressure-controlled.

3. Machine tool as defined in claim 2, characterized in that said flow-limiting means include an orifice plate and are controlled by a pressure difference occurring at said orifice plate.

4. Machine tool as defined in claim 3, characterized in that said orifice plate is arranged downstream from said flow-limiting means.

5. Machine tool as defined in claim 4, characterized in that said check valve is connected to an intermediate pipe located between said flow-limiting member means and said orifice plate.

6. Machine tool as defined in claim 2, characterized in that said flow-limiting means comprise a pressure-controlled shut-off valve which closes when the pressure difference exceeds a switching value.

7. Machine tool as defined in claim 6, characterized in that a check valve is connected in parallel with an orifice plate and opens at an opening pressure which is larger than the switching value of said shut-off valve.

8. Machine tool as defined in claim 3, characterized in that said check valve is connected to said supply pipe.

9. Machine tool as defined in claim 8, characterized in that said flow-limiting means comprise a pressure-controlled throttle valve.

10. Machine tool as defined in claim 1, characterized in that said low-pressure network includes a low-pressure reservoir.

11. Machine tool as defined in claim 1, characterized in that a check valve is provided between said low-pressure network and said low-pressure pump.

12. Machine tool as defined in claim 11, characterized in that a tank pipe with a low-pressure reservoir charging valve controlled by the pressure in said low-pressure network branches off from a connection between said check valve and said low-pressure pump.

13. Machine tool as defined in claim 1, characterized in that said high-pressure network includes a high-pressure reservoir.

14. Machine tool as defined in claim 1, characterized in that a check valve is provided between said high-pressure pump and said high-pressure network.

15. Machine tool as defined in claim 14, characterized in that a return pipe with a high-pressure reservoir charging valve controlled by the pressure in said high-pressure network branches off between said high-pressure pump and said check valve.

16. Machine tool as defined in claim 15, characterized in that said return pipe opens into a tank pipe between said check valve and said low-pressure reservoir charging valve.

17. A machine tool comprising:
a hydraulic drive for operation in a working motion with a demand of hydraulic medium below a preselectable maximum flow or in a rapid motion with a demand of hydraulic medium above said preselectable maximum flow;
high pressure network means for operating said hydraulic drive in said working motion;
a high pressure pump coupled to supply said high pressure network;
low pressure network means for operating said hydraulic drive in said rapid motion;
a low pressure pump coupled to supply said low pressure network;
flow limiting means, coupled to said high pressure network and responsive to a flow of hydraulic medium through a supply pipe for said hydraulic drive, said flow limiting means when being effective limiting a flow of hydraulic medium from said high pressure network into said supply pipe to said preselectable maximum flow, thereby creating a pressure drop in said supply pipe when the flow of hydraulic medium through said supply pipe exceeds said preselectable maximum flow due to rapid motion of said drive;
wherein said flow limiting means is ineffective if said flow of hydraulic medium through said supply pipe is below said preselectable maximum flow, thereby permitting the operation of said drive in said working motion with hydraulic medium supplied by said high pressure network means below said preselectable maximum flow; and
check valve means, coupled between said low pressure network and said supply pipe for connecting said low pressure network to said supply pipe by opening in response to said flow limitation caused by said flow limiting means during rapid motion of said drive.

18. A machine tool comprising:
a hydraulic drive for operation in a working motion with a demand of hydraulic medium below a preselectable maximum flow or in a rapid motion with a demand of hydraulic medium above said preselectable maximum flow;
high pressure network means for operating said hydraulic drive in said working motion;
a high pressure pump coupled to supply said high pressure network;
low pressure network means for operating said hydraulic drive in said rapid motion;
a low pressure pump coupled to supply said low pressure network;
flow limiting means, coupled to said high pressure network and responsive to a flow of hydraulic medium from said high pressure network that exceeds said preselectable maximum flow, said flow limiting means when being in an effective state limiting the flow of hydraulic medium from the high pressure network into a supply pipe coupled between said flow limiting means and said hydraulic drive, thereby creating a pressure drop in said supply pipe;
said flow limiting means being in an ineffective state when said flow of hydraulic medium through said supply pipe is below said preselectable maximum flow, thereby maintaining high pressure in said supply pipe to a substantial degree; and
check valve means, coupled between said low pressure network and said supply pipe for connecting said low pressure network to said supply pipe during rapid motion of said drive by opening in response to said flow limitation caused by said flow limiting means;
wherein said flow limiting means switches between effective and ineffective states in response to pressure relationships within said supply pipe while being unresponsive to a pressure difference between said high pressure network and said supply pipe.

* * * * *